William Foster's Imp't in Gas Pumps.
No. 118,709.     Fig. 1.     Patented Sep. 5, 1871.
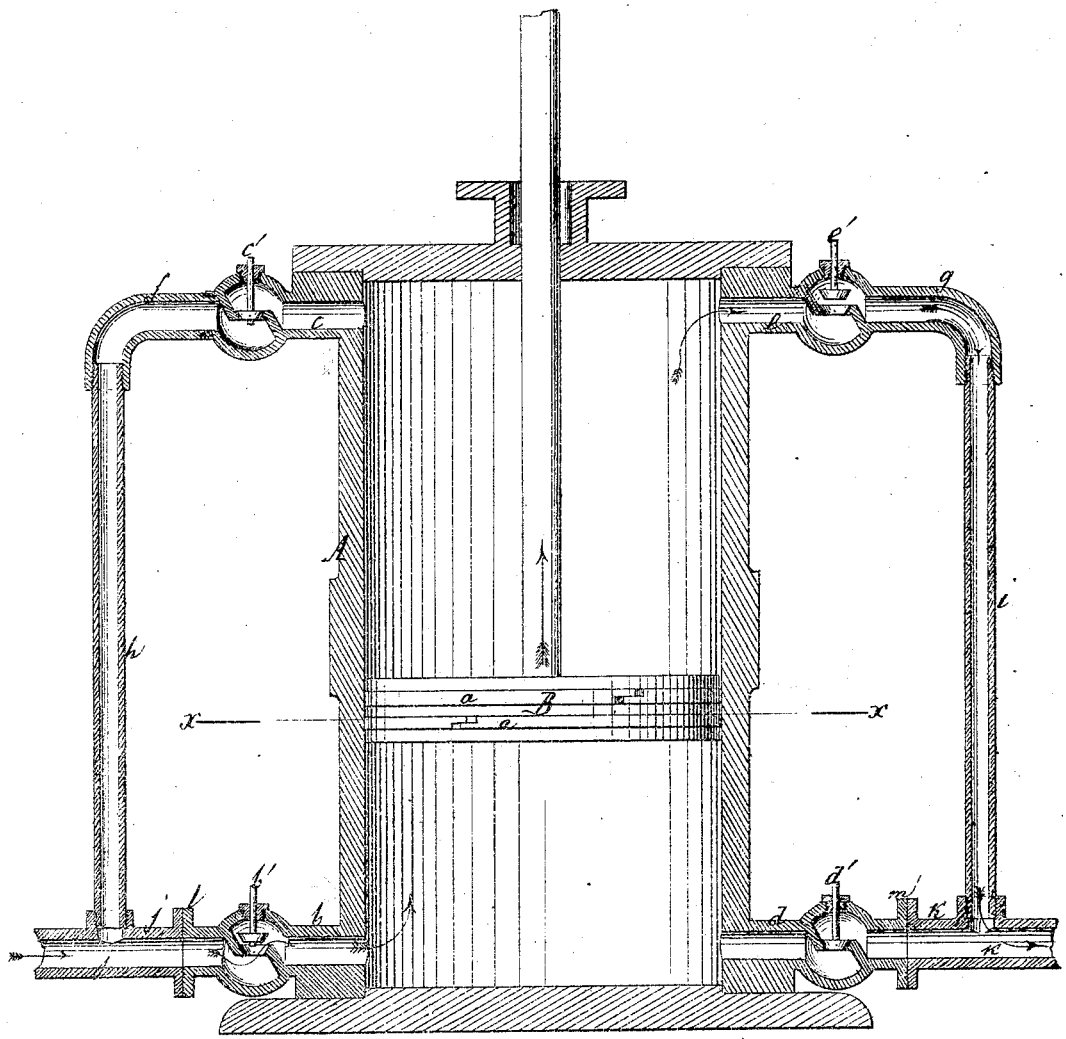
Fig. 2.
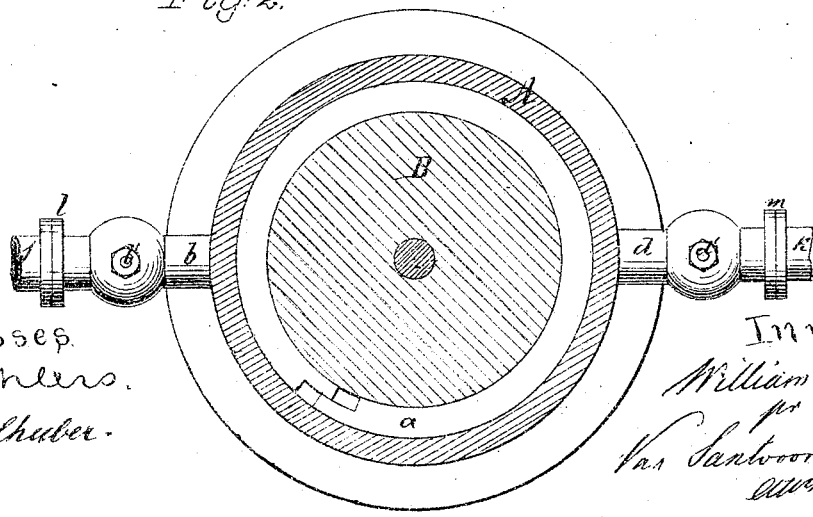
Witnesses.
C. Wanless.
E. Belhuber.
Inventor.
William Foster
per
Van Santvoord & Hauff
attys

UNITED STATES PATENT OFFICE.

WILLIAM FOSTER, OF BROOKLYN, NEW YORK.

IMPROVEMENT IN GAS-PUMPS.

Specification forming part of Letters Patent No. 118,709, dated September 5, 1871.

*To all whom it may concern:*

Be it known that I, WILLIAM FOSTER, of Brooklyn, in the county of Kings and State of New York, have invented a new and useful Improvement in Gas-Pumps; and I do hereby declare the following to be a full, clear, and exact description thereof, which will enable those skilled in the art to make and use the same, reference being had to the accompanying drawing forming part of this specification, in which drawing—

Figure 1 represents a vertical central section of this invention. Fig. 2 is a horizontal section of the same.

Similar letters indicate corresponding parts.

This invention relates to a double-acting reciprocating pump, which is intended particularly for removing gas from oil-wells, and which is composed of a cylinder which is provided with four outlets, two on each side, near its heads, each of these pipes being provided with a valve, and the pipes on the top being connected with those at the bottom by means of elbows, vertical branch pipes and horizontal flanged pipes, in such a manner that by connecting one of the bottom pipes with the supply and the other with the discharge-pipe the gas or other fluid is sucked in alternately at the top and then at the bottom on one side of the cylinder, and discharged at the other side, and at the same time easy access can be had to the valves by disconnecting the horizontal flanged pipes, the vertical branch pipes, and the elbows, and by these means a pump is obtained which can be easily kept in order, even by an inexperienced workman, or in such parts of the country where skilled labor cannot be had.

In the drawing, A designates a cylinder, in which works a piston, B. This piston is, by preference, packed with steel rings *a*, the ends of which are stair-shaped, and made to overlap each other, as seen in Fig. 1, so as to produce a tight joint with the least possible amount of friction. From the sides of said cylinder extend four pipes, *b c d e*, two on each side leading into the cylinder close to its heads. Each of these pipes contains a valve, *b′ c′ d′ e′*, and the pipes *b* and *c*, and also the pipes *d* and *e*, connect in the following manner. In the outer end of the case of each of the valves *c′* and *e′* are secured elbows *f g*, which connect, by vertical branch pipes *h i*, respectively, with horizontal flanged pipes *j* and *k*, secured respectively to flanges *l* and *m* on the outer ends of the cases of the valves *b* and *d*, the elbows, the vertical branch pipes, and the horizontal flanged pipes being connected with each other by screw-threads, so that, by disconnecting the horizontal flanged pipes from the flanges *l* and *m*, all the pipes and elbows can be readily taken off and easy access is had to the valves for the purpose of cleaning or refitting them.

The horizontal pipe *j* is connected with the supply-pipe, and the horizontal pipe *k* with the discharge-pipe, and if the piston moves up the valves *b′* and *e′* open, while the valves *c′* and *d′* close, and the gas or other fluid passes through the pipe *b* into the lower part of the cylinder, while the fluid contained in the upper part of the cylinder discharges through pipe *e*, elbow *g*, vertical branch-pipe *i*, and horizontal flanged pipe *k*. When the motion of the piston is reversed the valves *b′* and *e′* close, and the fluid is drawn into the cylinder through the pipe *c*, and it discharges through the pipe *d*.

By these means a pump is obtained which can be operated with ease and facility, which is not liable to get out of order, and which is particularly applicable for removing gas from oil-wells.

I am aware that gas-pumps have been before used, formed with straight inlet and exit-pipes, which are provided with horizontal working valves; but such I do not broadly claim. Neither do I claim the branch pipes, *per se*, for such are not new. The top inlet and exit-pipes of my pump are curved or bent, thus allowing a free and uninterrupted inlet and exit, and the pipes are formed with flanges, by which means they are readily detached when desired. The valves being arranged vertically, as described, will always seek their seats when the suction of the piston ceases to exist. These features I do not broadly claim; but—

What I claim as new, and desire to secure by Letters Patent, is—

As an improvement in gas-pumps, the cylinder A provided with the pipes *c e*, valves *c′ e′*, angular valve-partitions forming valve-seats, and curved pipes *f g*, in combination with the vertical pipes *h i*, flanged pipes *j b* and *k d*, the angular partitions forming valve-seats for the valves *b′ d′* arranged for joint action with the piston B packed with steel rings *a a*, the several parts constructed substantially as set forth.

This specification signed by me this 25th day of May, 1871.

WILLIAM FOSTER.

Witnesses:
E. F. KASTENHUBER,
E. A. ELLSWORTH.